T. J. SMITH.
COTTON PICKER.
APPLICATION FILED SEPT. 15, 1920.
1,373,983.
Patented Apr. 5, 1921.
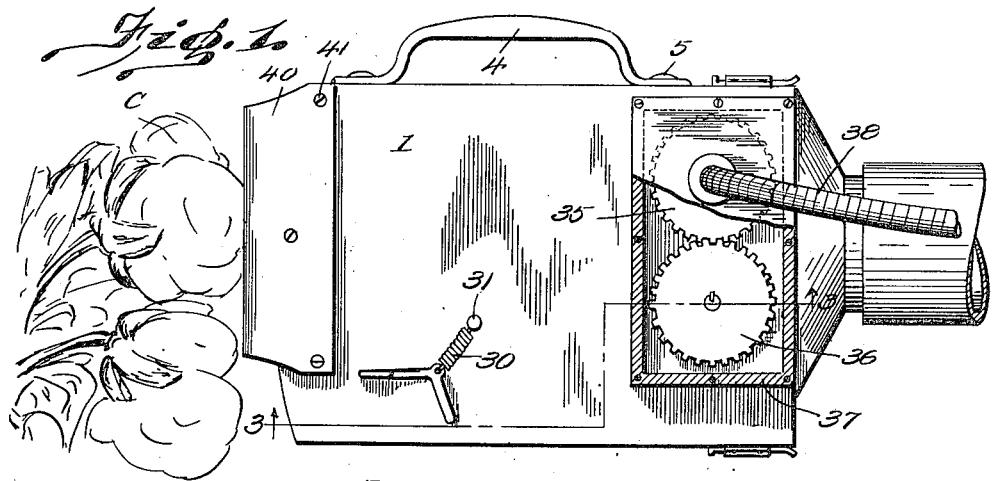
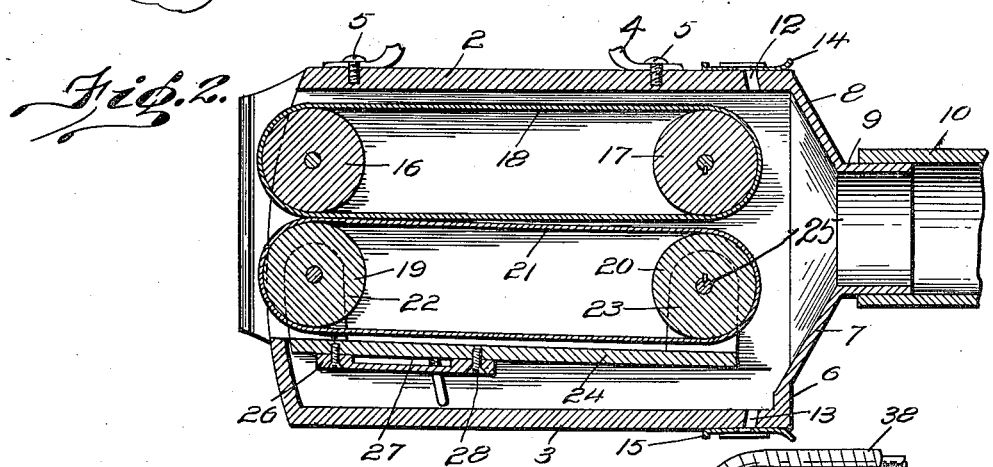
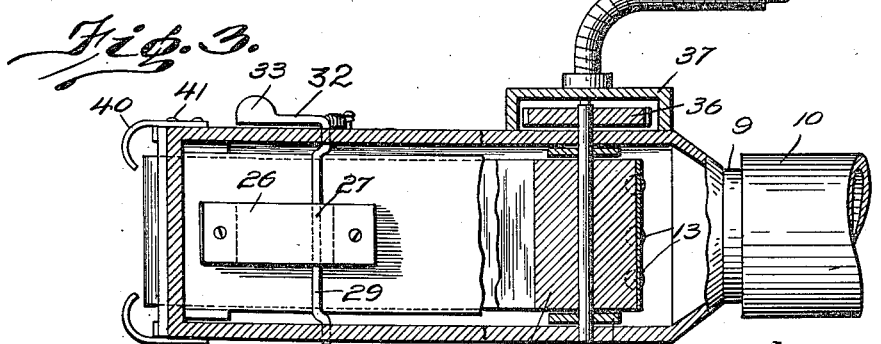
Inventor
Taylor J. Smith,
By Geo. P. Kimmel
Attorney
Witness

UNITED STATES PATENT OFFICE.

TAYLOR J. SMITH, OF UNION CITY, GEORGIA.

COTTON-PICKER.

1,373,983.   Specification of Letters Patent.   Patented Apr. 5, 1921.

Application filed September 15, 1920. Serial No. 410,504.

*To all whom it may concern:*

Be it known that I, TAYLOR J. SMITH, a citizen of the United States, residing at Union City, in the county of Campbell and State of Georgia, have invented certain new and useful Improvements in Cotton-Pickers, of which the following is a specification.

This invention relates to portable cotton pickers of that type wherein the cotton is detached from the plants by mechanical means directed by hand and operated from a distant source of power and subsequently conveyed to a suitable receptacle.

One of the objects of my invention is directed to a novel and improved portable cotton picker which will mechanically remove cotton from the plants without breaking the fiber or lowering its grade.

A still further object of my invention resides in the construction of a portable, mechanical picker of the above class which will efficiently remove cotton from the plants and deliver the same free of leaves, trash or dirt without tearing or breaking the cotton lint.

Another and very important object of my invention resides in the construction of a portable, mechanically operated picker which will be simple in construction, efficient in operation, practical, comprising but few parts and therefore inexpensive to manufacture.

With these objects in view and others which will be manifest and suggested as the nature and purpose of my invention are revealed in the following specification and drawing wherein I have shown a practical, yet preferred embodiment thereof, Figure 1 is a side view partly broken away to show the gearing.

Fig. 2 is a vertical section.

Fig. 3 is a longitudinal section taken on the line 3—3 of Fig. 1 looking in the direction of the arrow.

Similar numerals on the drawing referring to like parts in the specification, numeral 1 designates a substantially rectangular body or casing 1 having a closed top 2 open bottom 3 and a supporting handle 4 secured thereto by fastening elements 5. The rear wall 6 has its sloping portions 7, 8 formed in a spout 9 to which is fastened a chute or conveyer means 10 whereby the cotton is directed rearwardly by a suction fan (not shown) rearwardly of the picker. A plurality of angular slots 12, 13 in the top and bottom of the casing are provided with suitable slides 14, 15 which regulate the draft within the casing as is obvious.

Front and rear rollers 16, 17 journaled in the sides of the body are provided with a relatively wide, endless belt 18 which may be of cloth, leather, rubber or similar material. A corresponding pair of rollers 19, 20 are journaled directly below the upper rollers 16, 17 and are also provided with an endless belt 21.

Referring particularly to Fig. 2, it will be seen that the lower rollers 19, 20 are retained between the upstanding ears 22, 23 of a movable bottom 24 hinged to the lower shaft 25 of the rear, lower roller 20, Fig. 3.

A guide 26 slotted as at 27 is secured by screws or similar fastening means 28 to the movable bottom and retains a transverse crank arm 29. The crank arm is journaled in the sides of the body and is normally held in engagement with the movable bottom 24 by a spring 30 secured as at 31. The bent terminal 32 of the crank arm is provided with a thumb engaging portion 33 whereby the operator may separate the front rollers by hand if so desired. Since the movable, hinged bottom 24 carries the front lower roller 19, it is obvious that if a large boll of cotton or seed enters between the front rollers 16, 19, the said rollers will be slightly forced apart or this may be effected directly by the operator by depressing the crank arm with his thumb.

It will be noted that the hinged bottom 24 which is slightly inclined normally retains the respective rollers 16 and 19 and also the belts substantially in contact by the spring 30 connected to the crank arm. Since the crank arm operates in the slotted guide carried by the hinged bottom, it will be readily seen that as a seed enters between the rollers or the crank arm is actuated by the operator, the rollers and belts will be spread apart and subsequently returned to their normal position by reason of the resilient spring.

In order to drive the mechanism, I have provided spur gears 35, 36 rotatable with the upper and lower, rear roller shafts, said gears being inclosed in a rectangular casing 37 secured by suitable fastening means to the side of the body. A flexible shaft 38 connected to the gear 35 is driven by a suitable source of power from the rear. A pair of inwardly curved, metallic guards 40, is secured by screws 41 to the sides of the box for the obvious purpose of preventing the forward journals being clogged.

It will now be seen as the rollers and belts are revolved by the gearing the cotton locks, or seed cotton contained in boll C will be drawn therefrom by the rollers and carried between the belts to the rear of the body of picker head. It will be observed that the rear rollers are slightly spaced with respect to each other to allow for seeds to drop within the body and the resilient spring will permit the forward rollers to separate and allow large locks of seed cotton to pass therebetween without crushing, or injuring the seed in the least. The rear rollers are also sufficiently forward of the sloping walls and spout to permit the draft to convey the cotton into the chute.

In the accompanying drawings, I have illustrated my invention embodied in one form by way of example, and which in practice has been found to be highly satisfactory in obtaining the desired results. It will be obvious however, that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

1. In a cotton picker of the class described, a casing, a pair of spaced rollers journaled in said casing, an endless belt connecting the rollers, a transverse shaft, a movable bottom hinged to said shaft and provided with a complementary pair of rollers and an endless belt and spring pressed means for separating the forward rollers and endless belts.

2. In a cotton picker of the class described, a rectangular open ended casing, spaced rollers journaled in said casing, an endless belt connecting said rollers, a transverse shaft, a movable bottom hinged thereto and provided with vertically spaced ears supporting a pair of complementary rollers and an endless belt, spring pressed means for separating the forward rollers and endless belts and gearing for driving the rollers and belts.

3. In a cotton picker of the class described, a casing open at its front and rear ends, horizontal spaced rollers journaled in said casing, an endless belt connecting said rollers, a hinged bottom for said casing, complementary rollers and an endless belt carried thereby, spring pressed means for moving said bottom to separate the forward rollers and endless belts, and draft regulating means on said casing rearwardly of said rollers and belts.

4. In a cotton picker of the class described, a rectangular open ended casing, a pair of rollers journaled in said casing, an endless belt connecting the rollers, a hinged bottom, complementary rollers and an endless belt carried by upstanding ears from said bottom, gearing for rotating said rollers and belts, draft regulating means rearwardly of the top and bottom rollers, and guards secured to the sides of the casing for protecting the journals of the forward rollers.

5. In a cotton picker of the class described, a rectangular casing, a pair of rollers journaled in said casing, an endless belt connecting the rollers, a hinged bottom, complementary rollers and an endless belt carried by the upstanding ears of said hinged bottom, gearing for rotating said rollers, a casing for said gearing, a thumb pressed, spring controlled member for moving said bottom and separating the forward rollers and belts, and inwardly curved guards secured to the sides of the casing for protecting the front journals of the forward roller.

6. In a cotton picker of the class described, a rectangular casing, a pair of rollers journaled therein, an endless belt connecting the rollers, a transverse shaft, a hinged bottom, complementary rollers and an endless belt carried by said hinged bottom, a slotted guide secured to the bottom, a crank arm carried by the guide, a spring for retaining said crank arm normally against the bottom, thumb pressed means for separating the forward rollers, gearing for rotating all of said rollers, a casing inclosing said gearing, and inwardly curved metallic guards in front of the forward rollers for protecting the journals thereof.

In testimony whereof I affix my signature hereto.

TAYLOR J. SMITH.